Dec. 1, 1925.
O. C. BLAKESLEE
1,563,545
ADJUSTABLE AUTOMATIC PRESSURE RELIEF VALVE
Filed April 29, 1924
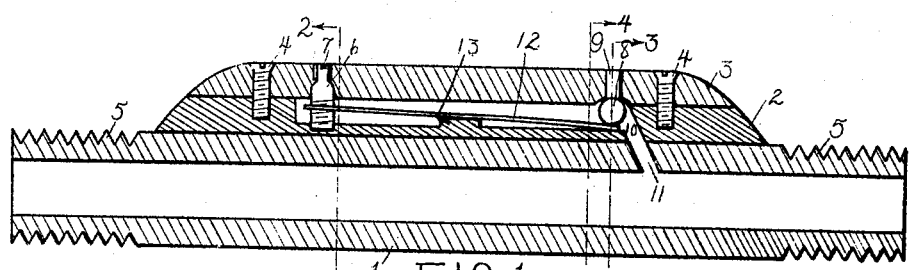
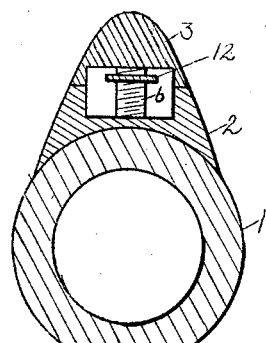
FIG. 2
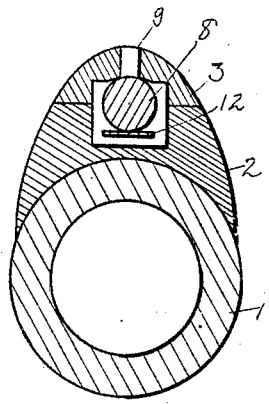
FIG. 3
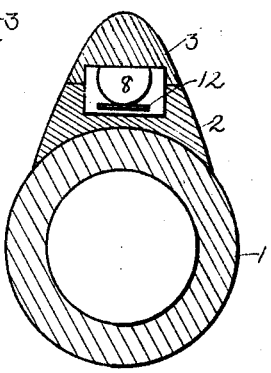
FIG. 4
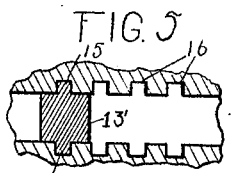
FIG. 5
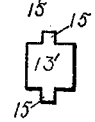
FIG. 6
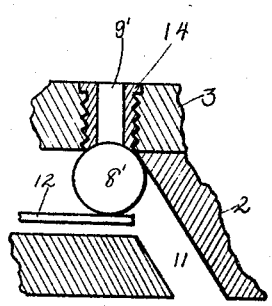
FIG. 7
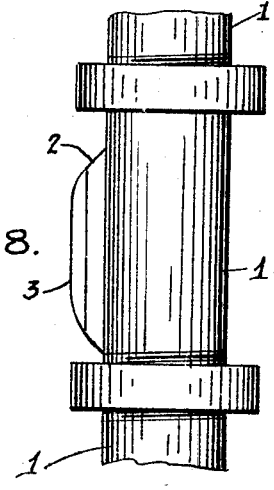
FIG. 8
ORRIN C. BLAKESLEE
INVENTOR.
BY Fred H Hayn
ATTORNEY.

Patented Dec. 1, 1925.

1,563,545

UNITED STATES PATENT OFFICE.

ORRIN C. BLAKESLEE, OF COMPTON, CALIFORNIA.

ADJUSTABLE AUTOMATIC PRESSURE-RELIEF VALVE.

Application filed April 29, 1924. Serial No. 709,773.

*To all whom it may concern:*

Be it known that I, ORRIN C. BLAKESLEE, a citizen of the United States, residing at Compton, in the county of Los Angeles and State of California, have invented a new and useful Improvement in Adjustable Automatic Pressure-Relief Valves, of which the following is a specification.

My invention relates to a new and useful improvement in an adjustable automatic pressure relief valve, capable of use in connection with oil or other wells, or may be of general application wherever such a valve is useful or may be needed.

It is an object of my invention to provide a device capable of use in connection with oil or other wells, whereby the gas pressure accumulating in such wells may be relieved, said gas being caused to enter the pipe line or tubing of said wells, and assist in raising the oil or other fluid from the bottom of the well casing.

A further object of my invention is to provide one of the sections of the sectional pipe line or tubing, by means of which the fluid is raised, with a device for automatically relieving the pressure of the gas accumulated in an oil or other well, said gas being permitted to enter said section and pipe line or tubing and assist in raising the fluid from the bottom of the well casing.

It is also an object of my invention to provide an improved automatic pressure relief valve, in which a spring, adjustably positioned, is utilized to actuate said valve.

A still further object of my invention is to provide an abutment or bridge, against which the spring of my valve is adapted to press, said abutment or bridge, if desired, may be made adjustable, or its position changed, whereby the lever arms of said spring may be lengthened or shortened in order to adjust the power of said spring.

Another object of my invention is to provide one or more of the sections of the sectional pipe line or tubing of an oil or other well with a base member adapted to be secured to or be integral with said section or sections, as, for example, by welding, or any manner in practise found desirable. It is also an object of my invention to provide a cap member, detachably or otherwise secured to said base member in any way found desirable, both or one of said members being cut away to provide a housing for an adjustable automatic relief valve, capable of controlling one or more ports leading from said well to the interior of said section or sections and said sectional pipe line or tubing.

It is also within the province of my invention to provide a removable bushing, whereby the seat of my valve may be replaced when it becomes worn.

It is also an object of my invention to provide a device which is simple in structure, which may be easily and inexpensively manufactured, which will be exceedingly efficient in operation, and which will not be easy to get out of order.

Further objects and advantages of my invention will become apparent as the description thereof proceeds.

In the accompanying drawings, in which like reference characters denote like parts thereon, Fig. 1 is a sectional view of the pipe line or tubing of an oil or other well equipped with my invention, Fig. 2 is an enlarged sectional view of Fig. 1, on the line 2—2, looking in the direction of the arrows, Fig. 3 is a similar view, taken on the line 3—3 of Fig. 1, Fig. 4 is a similar view on the line 4—4 of Fig. 1, Fig. 5 is a fragmentary sectional view showing a modification, Fig. 6 is a plan view of a modified form of abutment or bridge, used in connection with the form shown in Fig. 5, and Fig. 7 is a fragmentary detail sectional view of still another modification of my device.

Fig. 8 is a fragmentary elevational view of a series of pipe sections showing my device attached thereto.

Describing my invention more in detail, the numeral 1 indicates a section of the usual pipe line or tubing, said tubing being shown in fragmentary form in Fig. 8, with which an oil or other well is commonly provided. On said section 1 a base member 2 is formed integral or secured thereto in any desired manner, as, for example, by welding. To said base member is secured by screw bolts or other fastening means 4, a cap member 3, which forms the top of my device.

The members 2 and 3, either both or one alone, are cut away as shown to provide a housing for a leaf spring 12, which spring is adapted to abut against the bridge or abutment 13. Said spring 12 operates to retain the ball or other valve 8 in position against its seat, formed by cutting away part of the cap member 3, as clearly shown in Figs. 1 and 3.

To adjust the tension of the spring 12, a screw bolt 6, as best shown in Fig. 1, is screwed into the spring 12, and is of a configuration such as shown in said figure. To receive said bolt, the cap member 3 is bored at the top and counterbored at the bottom to form an offset, in order that said bolt will be securely pressed against said offset by the spring 12, and thereby prevent any of the gas accumulated in the well casing from entering through said bored portions, or any oil or other fluid within the pipe line or tubing from escaping therethrough.

The bolt or plug 6 is provided with a notch or a kerf 7 to accommodate a tool whereby said bolt and said spring may be adjusted, without removing the cap member 3. Said bolt is adapted to set loosely in the cap member 3 and in the base member 2, and is not screwed into the latter. The lever arm actuating the bolt 6, being shorter than that actuating the valve 8, the bolt 6 will at all times remain securely seated against said offset.

A series of ports 9, 10, and 11 are arranged in the members 3 and 2, and the pipe section 1, as shown in Fig. 1. the valve 8 controlling said port 9. It is clear that any arrangement of ports, and any desired form of valve may be provided, and that the shape and size of said ports, as well as the shape and size of said cut-away portions may take any form found desirable.

If desired, the abutment or bridge 13 may be made adjustable as shown in Fig. 5. In said figure the base member is provided with slots 16 to receive the flanges 15 of the movable abutment or bridge 13'. When it is desired to change the length of the lever arms of the spring 12, in order to adjust the strength of said spring, all that is necessary is to remove the cap member 3 from the base member 2 by unscrewing the bolts 4. It is a matter of but a moment to lift out the abutment or bridge 13', and replace it, either to the right or left, the flanges 15 taking into any pair of slots 16 found desirable.

Fig. 7 shows a modified form of my device in which a removable bushing 14 is provided for the purpose of renewing the valve seat when it becomes worn. Said bushing is provided with a port 9' and a seat against which a ball valve 8' is adapted to seat. When said seat has become worn, it may readily be replaced by unscrewing it from the cap member 3 and replacing it with another of said bushings.

In assembling my device, the bolt 6 is screwed into the spring 12, which is inserted underneath the ball 8, after which said bolt is pushed up through the hole in the cap member 2. Said cap member is now placed in position on the base member 3, which is secured in place by means of the bolts 4. The opening of the valve 8 may be adjusted to suit the particular requirements by adjusting the strength of the spring 12 by manipulating the bolt 6 through its notch or kerf 7 by means of a suitable tool.

It is clear that any number of sections of the well tubing or pipe line may be provided with my device as desired or found necessary in practice, or that said device may be placed anywhere that it may be useful or desirable.

In operation, the gas pressure having accumulated in the well casing, said pressure acts on the valve 8, against the spring 12, allowing said valve to be pushed inwardly, and accordingly permitting said gas to enter through the ports 9, 10, and 11, thus relieving the pressure in the casing, and assisting the pump to lift the fluid in the tubing or pipe line of the well.

It is also clear that my device may be modified throughout a wide range, and I therefore do not propose to be limited to the exact details of the construction shown and described, but reserve the right in practice to make any modification thereof within the scope of the appended claims.

Having thus described my invention, what I desire to protect by Letters Patent is:

1. In an oil or other well, in combination, a series of pipe sections adapted to form the pipe line or tubing of said well, a base member mounted on one of said sections, a cap member mounted on said base member, at least one of said members being cut away to provide a space, a series of ports in said members and said section to provide a communication between said well and said pipe line or tubing, a valve housed in said space and adapted to control said communication, a spring housed in said space and adapted to hold said valve in position against the gas pressure accumulating in said well, and means for adjusting the strength of said spring, said valve functioning to permit said gas to enter said section and said pipe line or tubing, to relieve the pressure in said well and to assist in raising said oil or other fluid.

2. In a device of the class described, in combination, a pipe line or tubing for oil or other wells, a pipe section detachable from said pipe line or tubing, a base member secured to said pipe section, a cap member secured to said base member, at least one of said members being cut away to provide a space, one or more ports bored in said members, at least one port bored in said section, said port being placed in alinement with said first named port or ports, and a spring-controlled valve housed in said space, said valve, when the gas pressure has accumulated in said well, being adapted to open against the pressure of said spring, whereby said gas may be permitted to enter said pipe section and said pipe line or tubing to assist in raising the oil or other fluid.

3. In a device of the class described, in combination, a pipe line or tubing for oil or other wells, a pipe section adapted to be detachably connected to said pipe line or tubing, a member mounted on said pipe section, another member mounted on said first mentioned member, said pipe section and said members being provided with means for establishing communication between said well and said pipe line or tubing, at least one of said members being provided with a space, and means, housed in said space, whereby, when the gas pressure builds up in said well, communication may be established between said well, through said members and said pipe section, to assist lifting said oil or other fluid.

4. In an oil or other well, in combination, a pipe line or tubing made of detachable sections, a base member mounted on one or more of said sections, a cap member mounted on said base member, at least one of said members being cut away to provide a space, ports in said members and in said section or sections whereby communication may be established between said well and said pipe line or tubing, and adjustable means housed in said space, for controlling said ports, whereby the gas pressure accumulating in said well, may operate said means so that said gas may enter said pipe line or tubing and assist in lifting the oil or other fluid in said well.

5. In an oil or other well, a series of sections adapted to form the pipe line or tubing of said well, a base member mounted on one or more of said sections, a cap member mounted on said base member, ports for establishing communication between said well and said pipe line or tubing, and an adjustable automatic relief valve for controlling said ports, whereby, when the gas pressure has built up in said well, said pressure may be relieved in said wall by said valve.

6. In an oil or other well, a series of sections adapted to form the pipe line or tubing of said well, and means mounted on one of said sections whereby the gas pressure accumulating in said well may be relieved, substantially as described.

7. In an oil or other well, a series of sections adapted to form the pipe line or tubing of said well, an automatic adjustable relief valve, mounted on one or more of said sections, whereby, when the pressure of the gas in said well has accumulated beyond a certain point, said pressure may be relieved by said valve through said pipe line or tubing, said gas assisting in lifting said oil or other fluid, substantially as described.

8. In an oil or other well, in combination, a series of sections adapted to form the pipe line or tubing of said well, a series of adjustable automatic relief valves mounted on said sections, said valves being adapted to be regulated in such a manner that they may open at various points along said pipe line or tubing to relieve the pressure of the gas accumulating in said well through said pipe line or tubing, substantially as described.

9. An adjustable automatic pressure relief valve for use in an oil or other well, a base member, a cap member, at least one of said members being cut away to provide a space, ports in said members, a valve, housed in said space, for controlling at least one of said ports, a spring also housed in said space for operating said valve, an abutment or bridge against which said spring is adapted to press, and means for adjusting the strength of said spring, said valve being adapted to relieve the pressure in said well.

10. In an adjustable automatic pressure relief valve, in combination, a housing, said housing being provided with a port and an opening, a valve adapted to control said port to permit a fluid to enter said housing, means associated with said valve for resisting the pressure of said fluid on said valve, and a plug associated with said last mentioned means and said opening to prevent said fluid from escaping through said opening.

11. In an adjustable automatic pressure relief valve, in combination, a housing, said housing being provided with a port and an opening, a member for controlling said port, a second member adjustably associated with said opening, and a fluid pressure-resisting means associated with both of said members, whereby said first member may permit a fluid to enter said housing through said port, and the second member may prevent said fluid from leaving said housing through said opening.

12. In an adjustable automatic pressure relief valve, in combination, a housing, said housing being provided with at least one port and an opening, a member for controlling said port, a rotary and reciprocating member for holding said opening closed, said last member being provided with means whereby it may be adjusted from without said housing, and means associated with both of said members for simultaneously resisting the movement of both of said members, said second member being adapted to adjust the effectiveness of said means.

13. In an adjustable automatic pressure relief valve, in combination, a housing, said housing being provided with at least one port, a valve adapted to control said port, a removable bushing associated with said valve and said port, fluid pressure resisting means associated with said valve, and a plug associated with said last mentioned means and with an opening in said housing to prevent the fluid which enters said housing through said port from escaping through said opening.

14. In an automatic adjustable pressure relief valve, in combination, a housing, said housing being provided with at least one port and an opening, a valve for controlling said port, a plug for holding closed said opening, and spring means for resisting the movement of said plug and said valve, said plug being provided with means whereby said plug may be adjusted and said spring means may be adjusted, thereby effectively controlling said port and sealing said opening.

ORRIN C. BLAKESLEE.